United States Patent [19]

Dunn et al.

[11] Patent Number: 5,349,640
[45] Date of Patent: Sep. 20, 1994

[54] OPTION BUS ADAPTER

[75] Inventors: Tave P. Dunn; Larry A. Stell; William F. Dunn, Jr., all of Austin, Tex.; Norman Endick, Munich, Fed. Rep. of Germany

[73] Assignee: ROLM Company, Santa Clara, Calif.

[21] Appl. No.: 82,658

[22] Filed: Jun. 24, 1993

[51] Int. Cl.$^5$ .............................................. H04M 9/00
[52] U.S. Cl. .................................. 379/387; 379/399; 379/89; 379/93; 379/201; 379/400; 379/401; 379/414; 370/67; 370/85.1; 370/85.9; 370/110.1
[58] Field of Search ................... 379/387, 399, 89, 93, 379/201, 400, 401, 414; 370/67, 85.1, 85.9, 110.1

[56] References Cited

U.S. PATENT DOCUMENTS 4,685,121  8/1987  Sanglier ........................... 379/90
5,046,188  9/1991  Molnar ............................ 379/94
5,185,784  2/1993  Nashimoto ....................... 379/94

Primary Examiner—James L. Dwyer
Assistant Examiner—Jacques M. Saint-Surin

[57] ABSTRACT

A method and apparatus for connecting a programmable computing device to a digital telephone via an adapter. The digital telephone includes an option bay connection, having a hierarchical control protocol. The option bay connection makes available several types of information including local analog audio, and analog voice, digital voice, digital data and telephone control streams. The adapter passes the telephony control data to and from a programmable computing device such as a personal computer, enabling an application operating on the computing device to control or monitor the operation of the telephone. The adapter includes a microcontroller and an interface for a serial port and can thus be connected to the serial port of the programmable computing device.

14 Claims, 9 Drawing Sheets

TELEPHONE BLOCK DIAGRAM

TELEPHONE BLOCK DIAGRAM

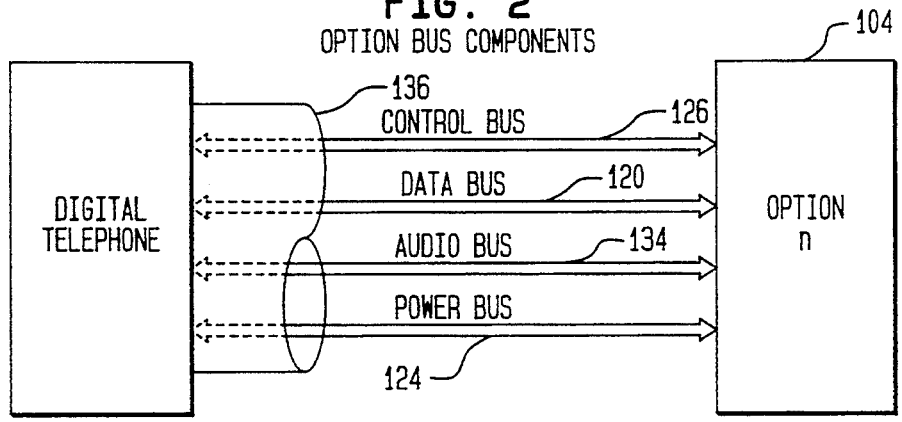
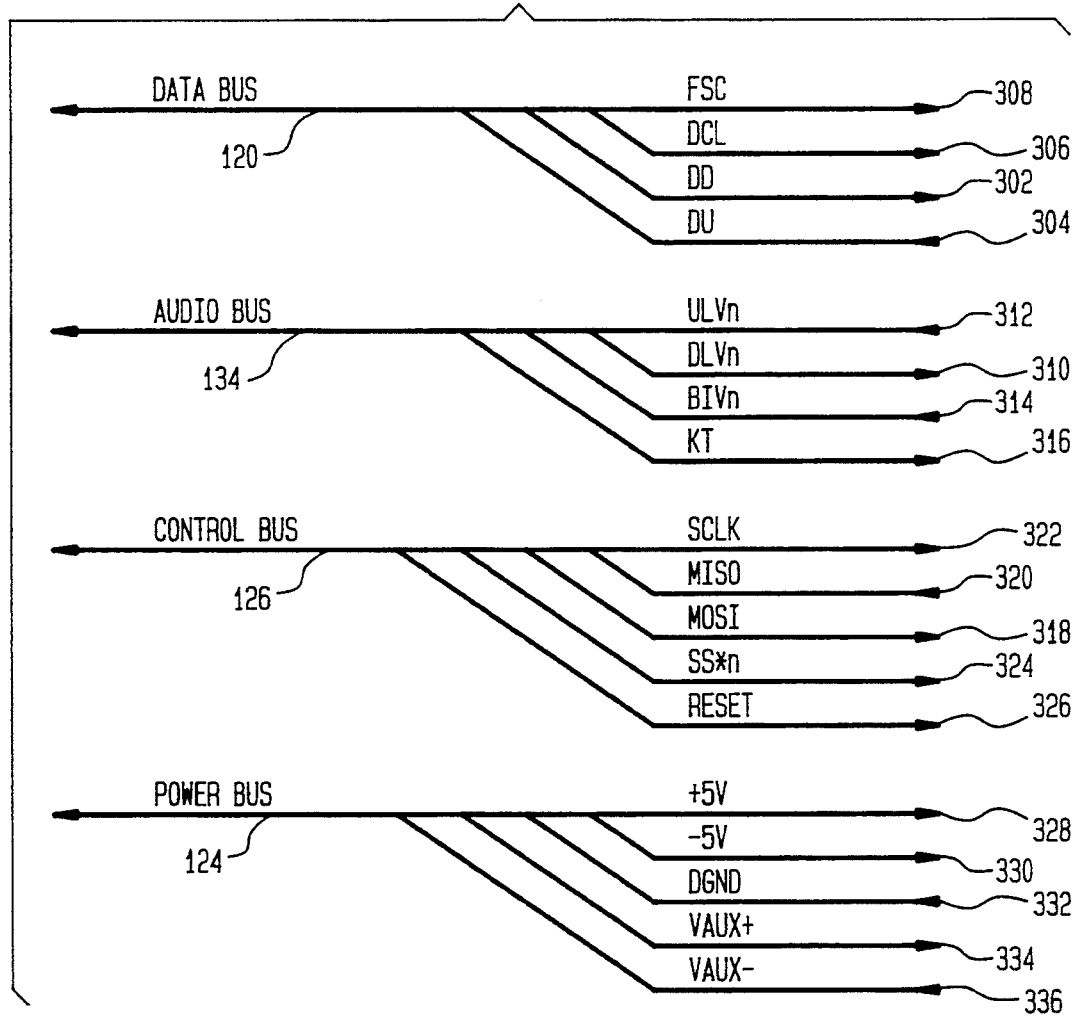

DATA BUS FRAME

AUDIO CONTROL BLOCK DETAIL

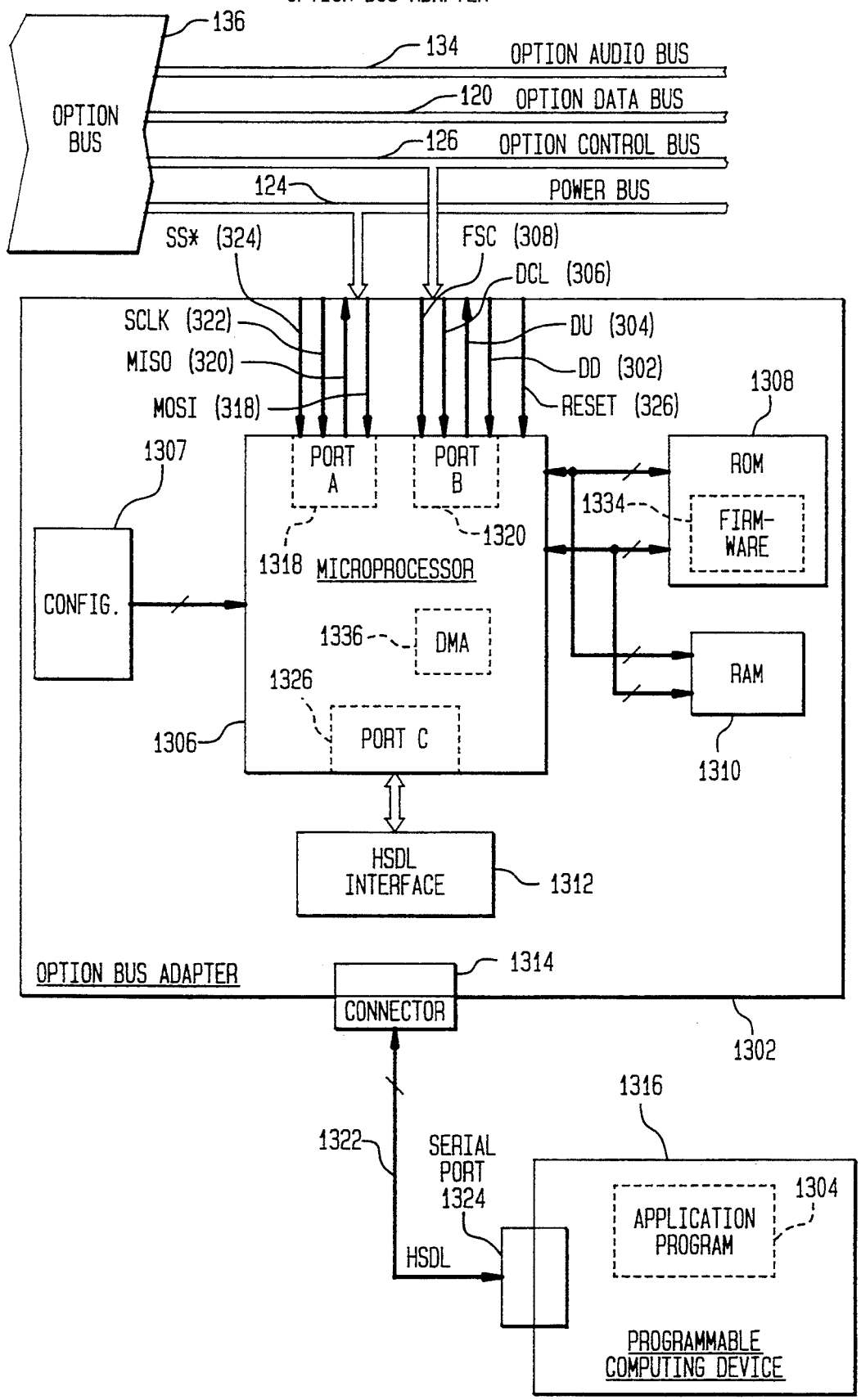

5,349,640

OPTION BUS ADAPTER

CROSS REFERENCE TO RELATED APPLICATIONS

This application is related to Ser. No. 07/916,286 filed on Jul. 17, 1992.

BACKGROUND OF THE INVENTION

A. Field of the Invention

This invention relates to a telephone control interface system for use with digital telephones using a bus protocol which is coupled to programmable computer control.

B. Related Art

It is known in the art to provide a digital telephone with a general option protocol that enables a broad variety of options to be interchangeably connected to the telephone by way of common bus (the "option bus"), wherein internal telephone signals can be monitored and processed without the need for individual corresponding conductors. Such an option bus is present, for example, in the ROLMphone 600 models. The Option Bus provides a method and apparatus for connecting remote options to a digital telephone base. The method provides physical and communications protocols for connections and provides a flexible control scheme which can be as simple or elaborate as a given option requires.

The ROLMphone 600 includes an option bay connection, having a hierarchical control protocol to a digital telephone and makes available several types of information, including local analog audio, analog voice, digital voice, digital data and telephone control streams.

One of the options available for the ROLMphone 600 is a Data Communications Option (DCO). The DCO connects to the option bus and uses the available telephone control stream. Access to this control stream is via an applications programming interface (API) which interprets and manipulates the telephone control stream and presents the information in a different protocol and format to a programmable computing device such as a personal computer.

The API interface is useful because it provides an abstraction of telephony control that is more straightforward to a programmer than the actual telephone control protocol used in the telephone. Consequently, however, the DCO does not always present to the programmable computing device a detailed and accurate picture of what is happening within the telephone. In addition, the DCO may report information that is moving within the telephone, but in many instances does not provide a method to alter or altogether stop the flow of control information within the telephone. Further, the DCO operates at a fixed option bus priority and thus can only provide a "picture" of activities from its view of the option bus. Finally, the DCO is an expensive option, costing roughly the same amount as the telephone itself. What is needed is a way for the user to be able to directly monitor and manipulate the telephone control information at the programmable computing device by having all of the telephone control information received at an option slot in an unaltered form. It would also be desirable to allow the user to select the priority of the option on the bus and thus customize the function of the telephone.

SUMMARY OF THE INVENTION

There is provided a system and method of providing all option control bus information to a programmable computing device. In a preferred embodiment, a user installable option is provided in the form of Option Bus Adaptor. Whenever telephony control data is sent to the Option Bus Adaptor, the Option Bus Adaptor passes that information to a programmable computing device over a standard RS-232 connection. In the opposite direction, the Option Bus Adaptor takes any information received from the programmable computing device via the RS-232 connection and sends it over the telephone's option bus, observing proper option control bus rules.

It is the responsibility of the programmable computing device to send any received telephony control information that should continue on in the telephone back to the Option Bus Adaptor once it has been examined and/or modified. Thus the programmable computing device can delete undesirable control information from the control information that continues on in the telephone.

There is also provided a method of indicating the desired option bus priority of the Option Bus Adaptor so that the telephony control stream can be monitored and/or modified at any point between options of any priority.

BRIEF DESCRIPTION OF THE DRAWING

FIG. 2 details the components of the Option Bus of FIG. 1;

FIG. 3 is a more detailed diagram showing the component signal lines of the Data Bus, Audio Bus, Control Bus and Power Bus of FIG. 2;

FIG. 13 is a block diagram of an Option Bus Adapter.

Like numbered reference numerals appearing in more than one figure represent like elements.

DETAILED DESCRIPTION OF THE PREFERRED EMBODIMENT

Figure 1:
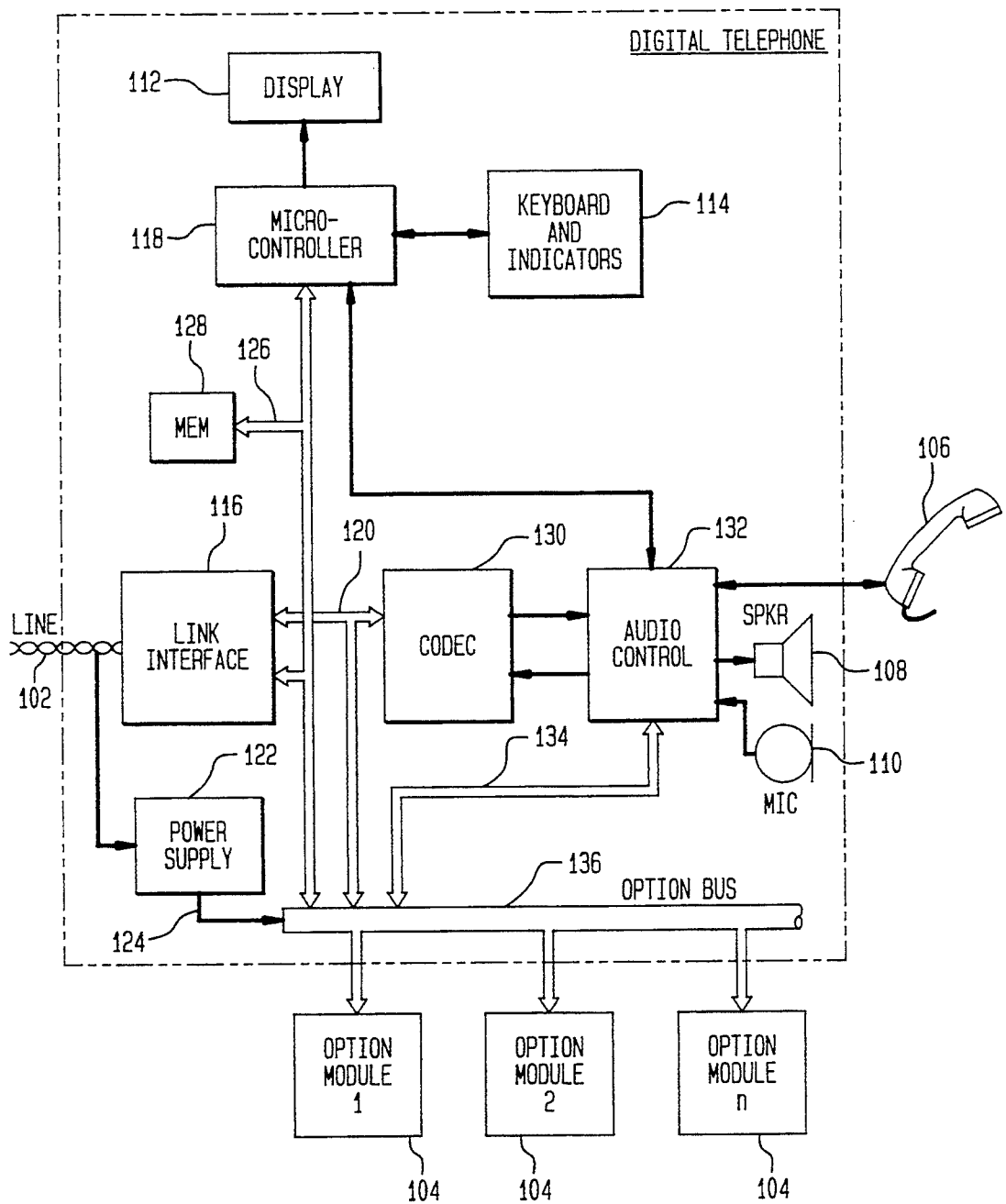
FIG. 1 is a diagram of a digital telephone according to an embodiment of the present invention.

A telephone of a type that can be used in conjunction with the present invention is illustrated schematically in FIG. 1. The telephone includes a connection to a digital telephone line 102 (e.g. a ROLMlink line) and one or more connections for optional peripherals 104. The optional peripherals 104 will alternately be referred to in this disclosure as Option modules 104. Typically, the telephone also has a handset 106, speaker 108, microphone 110, display 112, and keyboard 114 with keys and indicators.

The telephone is connected to the digital telephone line 102 via the link interface 116 which handles transfers of telephone control information between a microcontroller 118 and the digital telephone line 102. The link interface 116 also translates the digital telephone line's voice and data format to the data format used on the Option Data Bus 120. The link interface 116 also provides miscellaneous timing signals required by the rest of the telephone. Also connected to the telephone line 102 is a power supply 122 which converts the telephone line's voltage to other voltages required by the telephone. These voltages are distributed within the telephone on a Power Bus 124.

The microcontroller 118 is connected to the link interface 116 via an Option Control Bus 126. The microcontroller 118 is a conventional microprocessor which controls all the telephone's functions, and is the source and destination of all communications with a private branch exchange (PBX) switch (not shown). The microcontroller 118 is also connected to a keyboard 114 and, optionally, to a display 112.

The keyboard 114 includes the telephone keys, the indicators and associated control logic. The display 112, typically an LCD device, is used to display messages sent from the PBX via the digital telephone line 102, or messages from an Option module 104 sent via the Option Control Bus protocol (described more in detail later in this document). Additionally, an external memory 128, which may be of non-volatile type, can be attached to the microcontroller 118 via the Option Control Bus 126.

A coder/decoder (CODEC) 130, is connected to the Option Data Bus 120 to convert the digital voice information to an analog form. The analog voice is amplified appropriately and routed to/from a handset 106 and/or a speaker 108 and microphone 110 by an audio control block 132. The audio routing is controlled by connections from the microcontroller 118. The audio control block 132 contains circuitry required for the hands-free speakerphone function. The audio control block 132 also routes analog audio signals to/from the Option Audio Bus 134 for use by the Option modules 104.

The Option Control Bus 126, the Option Data Bus 120, the Option Audio Bus 134 and the Power Bus 124 are collected together as the Option Bus 136. FIG. 2 further details the component busses of the Option Bus 136. The Option Bus 136 is linked to connectors in the telephone for connection to the Option modules 104. The Option modules 104 can be of the "plug-in" type which are user installable.

Purposes and functions of the Option modules 104 include but are not limited to additional keys and indicators, headset attachment, data communications, digital voice processing, alternate telephone personality modules etc. All resources and information of the telephone can be made available to an Option module 104, regardless in which Option module 104 bay it is connected. Resources include but are not limited to the handset 106, speaker 108, microphone 110, display 112, keys and indicators 114, and ringer circuits. Information includes downlink audio, uplink audio, audio from other modules, downlink control messages, uplink event messages, downlink data, and uplink data.

As in known in the art, the option modules can be of a user installable type which plug into option bays provided at the base of the telephone. The ROLMphone 600, available from ROLM Company of Santa Clara, Calif. is an example of a telephone providing such option bays. The physical configuration of the options can be, for example, as described in U.S. patent application Ser. No. 7/903,582 (filed on Jun. 25, 1992).

Access to the telephone resources and some of the information is arbitrated by the microcontroller 118 via a hierarchical option control protocol (described in more detail later in this document). Not all elements of the Option Bus 136 may be required by a Option module 104. For example, additional keys and indicators (sometimes referred to as a DSS) only require the Option Control Bus 126 and only those signals are needed at its connector.

FIG. 3 details the signals included in the Option Bus 136. The Option Data Bus 120 is based on the public domain standard GCI bus. The Option Data Bus 120 is a bit synchronous, time division multiplexed, full duplex, serial data bus. Downlink data from the link interface 116 is carried on Data Downstream (DD) line 302. Uplink data is carried on Data Upstream (DU) line 304 to the link interface 116. The Data Clock (DCL) line 306 carries the clocking signal, sourced by the link interface 116, which is in sync with the bit transfers. The Frame Sync (FSC) line 308 carries the FSC signal, which is indicative of the start of each data frame and is also sourced by the link interface 116.

Figure 4:
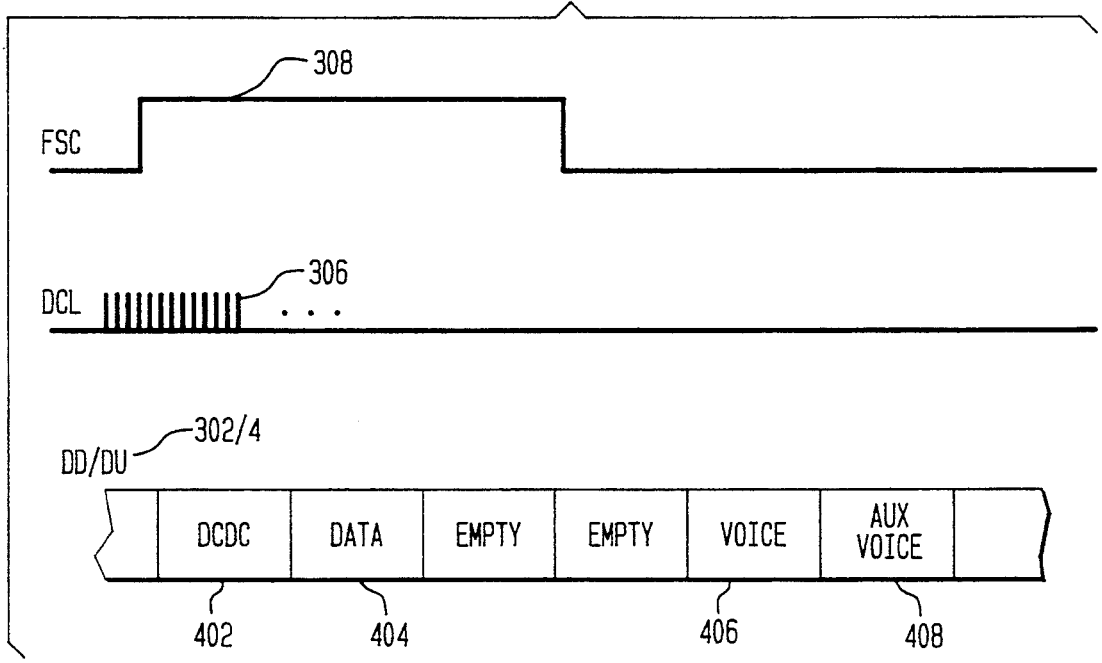
FIG. 4 is a diagram of the frame format of the data and its relationship to the control signals on the Data Bus of FIGS. 1-3.

Each data frame is organized into fields, as detailed in FIG. 4. These fields include Data Communications and Data Control (DCDC) 402, data 404, voice 406, and auxiliary voice 408. By using the timing relationships between the FSC and DCL signals, an Option module 104 can send or receive digital data or voice.

The CODEC 130 also transfers its voice data to the link interface 116 via the Option Data Bus 120. In normal telephone operation the CODEC 130 transfers the voice data through the voice field 406. However, a special mode permits the CODEC 130 to transfer voice data through the auxiliary voice field 408, however, the voice data to and from the PBX remains in the voice field 406. This allows an Option module 104 to intercept the voice data for processing and then pass it on. This is useful for advanced digital audio processing applications.

Turning again to FIG. 3, the Option Audio Bus 134 provides Option modules 104 with access to several audio sources and destinations within the telephone. Downlink audio from the CODEC 130 is provided on Downlink Voice (DLVn) line 310. Uplink audio to the CODEC 130 is put onto the Uplink Voice (ULVn) line 312. Audio to be sent devices in the telephone base such as the handset 106 or the speaker 108, is put on the Base Input Voice (BIVn) line 314. It should be understood that unique DLVn, ULVn and BIVn lines 310–314 are provided to each Option module 104 (as denoted by the subscript n).

Figure 5:
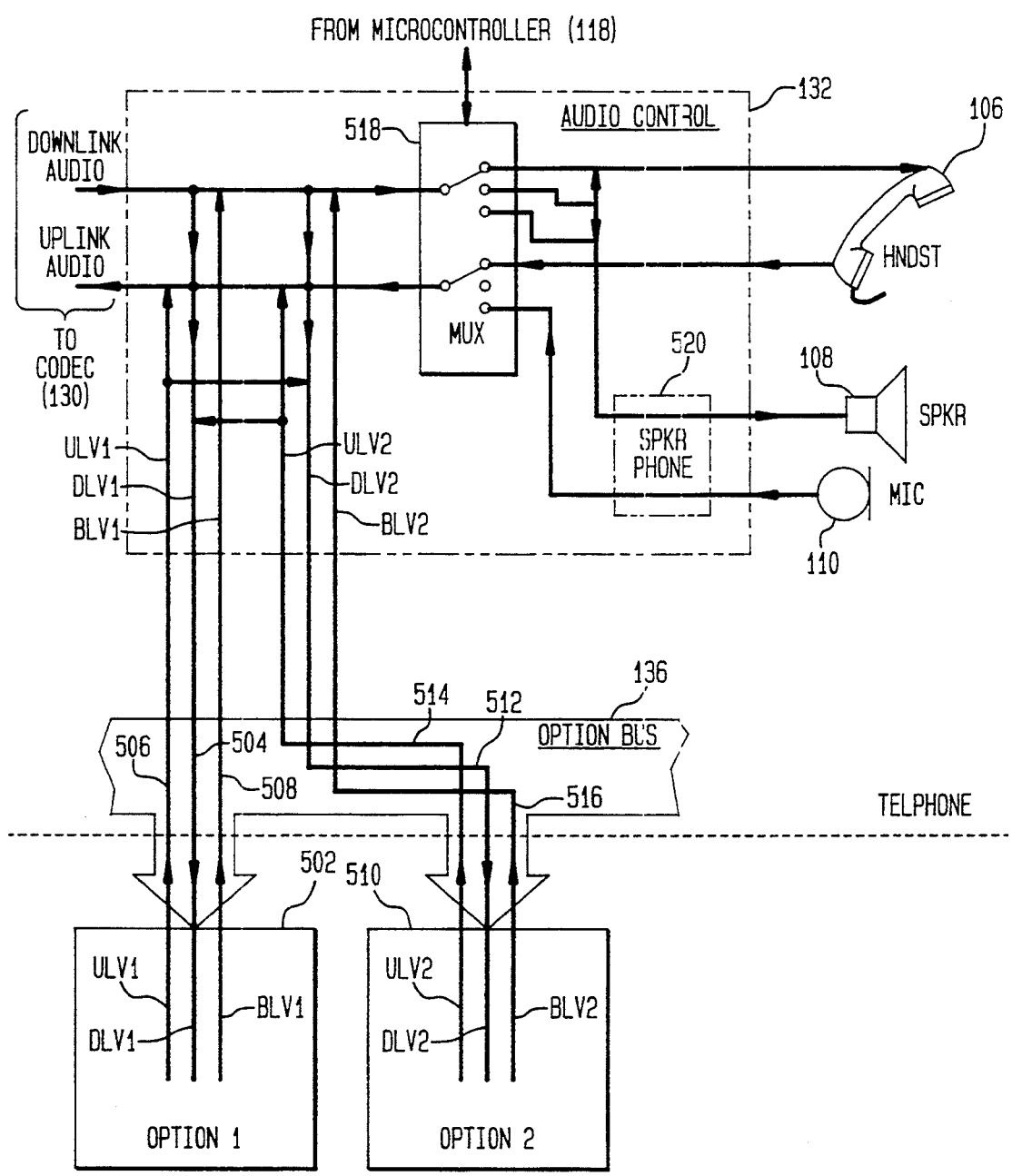
FIG. 5 is a more detailed diagram of the Audio Control Block of FIG. 2, showing an example of an interconnection with two options by way of the Option Bus.

For example, as illustrated by FIG. 5, in a telephone with two Option module 104 bays, module bay 1 502 would be connected to DLV1 504, ULV1 506, and BIV1 508; likewise module bay 2 510 would be connected to DLV2 512, ULV2 514, and BIV2 516. This facilitates the proper amplifying and combining of audio signals such that multiple modules can coexist.

An audio tone is produced whenever a key is pressed on the telephone keypad or an extended keyboard option such as a DSS. This signal is carried on keytone (KT) line 316 to each module (not shown). All Option modules 104 have access to uplink and downlink audio whenever the telephone is active. Additionally, each Option module 104 receives, with its downlink audio, the uplink audio of the other Option modules 104. This allows the Option modules 104 to "talk" to each other. The Option modules 104 can send audio to the handset 106 receiver, the speaker 108 or both. Likewise, the Option modules 104 can receive audio from the handset 106 microphone or the speakerphone microphone 110.

Switching of these audio paths is controlled by the microcontroller 118 by way of a conventional multiplexer 518 and facilitated by the hierarchical option control protocol. For a telephone requiring hands-free speakerphone operation, a conventional speakerphone circuit 520 (FIG. 5) can be installed between the speaker 108 and microphone 110 and the multiplexer 518.

The Option Control Bus 126 is based on the conventional Serial Peripheral Interface (SPI) bus. The Option Control Bus 126 is a bit synchronous, full duplex, serial data bus. The Option Control Bus 126 is used to transfer control information between the microcontroller 118 and the option modules 104. Data from the Option modules 104 to the microcontroller 118 is carried on the Master In/Slave Out (MISO) line 320. Data from the microcontroller 118 to the Option modules 104 is carried on the Master Out/Slave In (MOSI) line 318. The Serial Clock (SCLK) line 322 carries the serial clocking signal for the data bits. The slave select (SS*n) line 324 carries a slave select signal which enables (or addresses) transfers to option modules 104. Each option module has a unique slave select line 324 such that only one is enabled at a given time. Thus in a telephone with three option ports the signals SS*1, SS*2 and SS*3 would be provided, respectively, to ports 1, 2 and 3. A RESET line 326 is provided on the Option Bus 136 to synchronize option modules during reset events, such as "power on", within the telephone.

Power to the Option modules 104 is provided by the Option Power Bus 124. These lines 328-336 provide the logic voltages +5 V, −5 V and Data Ground (DGND) as well as an auxiliary power supply, +VAUX and −VAUX, for Option modules 104 requiring higher levels of power.

Information flow between the microcontroller 118 and the option modules 104 is mediated by a hierarchical option control protocol. Devices internal to the telephone, such as the link interface 116 and the memory communicate with the microcontroller via the Option Control Bus 126. Though the interface is the same for these devices, the protocol used may differ from that of external option modules 104.

Figure 6:
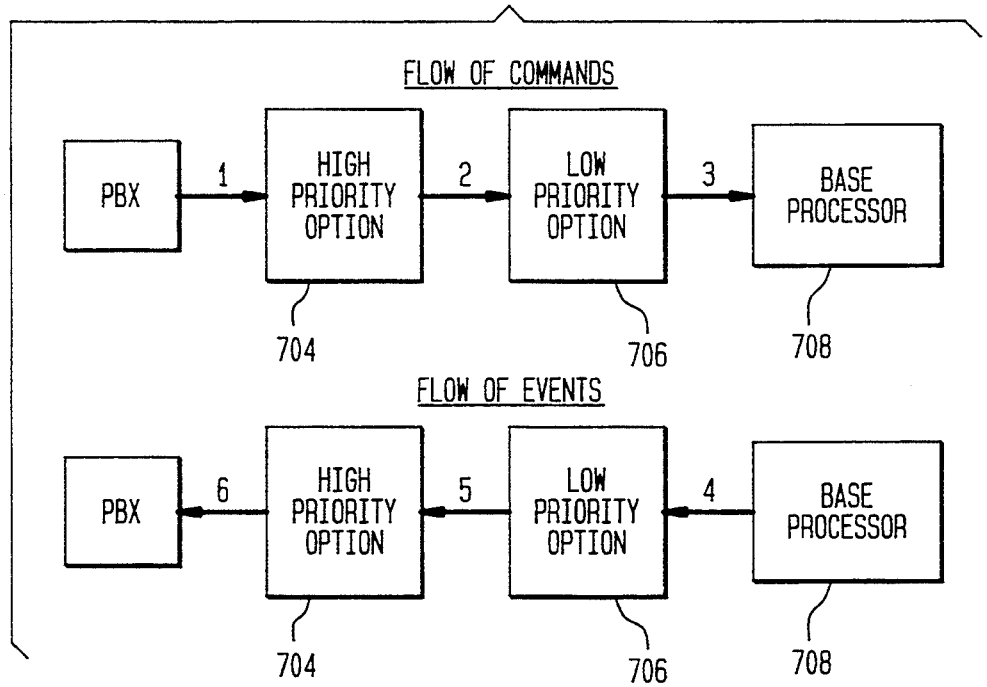
FIG. 6 is a flow diagram of message flow in an embodiment having two options.

FIG. 6 is an example of message flow in an embodiment with two options. Independent of the physical connection of FIG. 1, options are ordered according to priority. A high priority option would typically be a data option, such as a data communications option (DCO). A low priority option would typically be an extended keyboard option (DSS).

The flow of commands (messages from the PBX to the telephone) is illustrated by the set of blocks at the top of the figure. Commands flow first to the highest priority options (Message 1), to the lower priority option (Message 2) and finally to the remainder of the telephone and its associated microcontroller 118 (via Message 3).

The flow of events (messages from the telephone to the PBX) is illustrated at the bottom of FIG. 6. Events flow from the microcontroller 118 to the lowest priority option (Message 4), to the highest priority option (Message 5) to the PBX (Message 6).

The microcontroller's 118 firmware is logically split into two components: the Base Processor and the Option Processor. The base processor controls the digital telephony functions of the telephone. The Option Processor distributes messages to options and the Base Processor.

At any point in the above-described process an option or the Base Processor can intercept, modify or synthesize a command or event message. The PBX can independently send messages at will. In addition, the system can include any number of smart options (from zero to N). The flow of messages is independent of the particular option module bay to which an option is connected. Options have no requirement of knowledge of the outside system to communicate. Operation codes contained in the messages contain no address information and only encode the direction (command or event) and the type of message.

Figure 7:
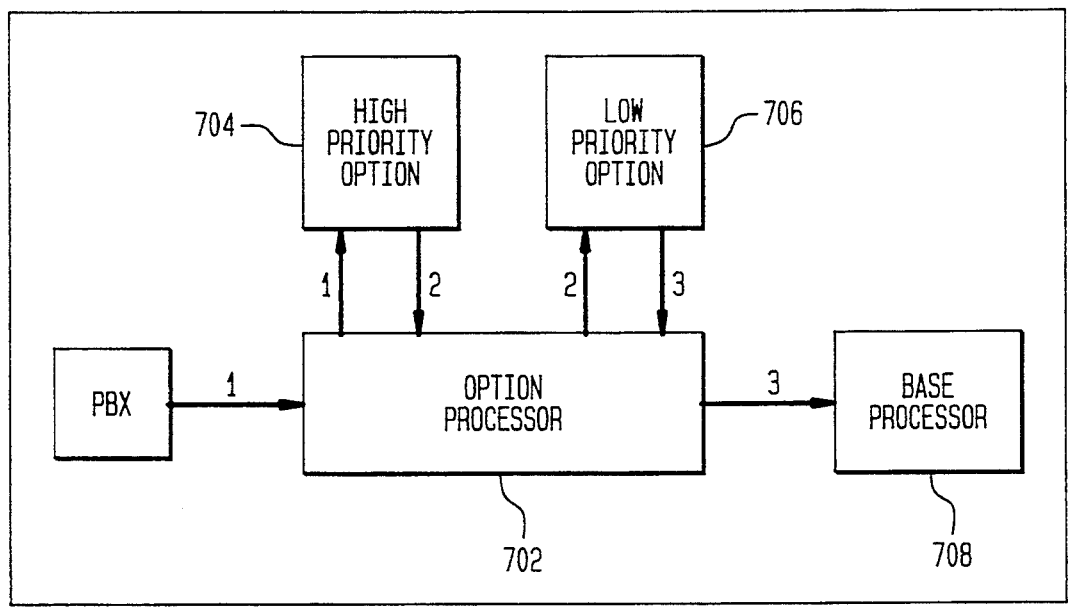
FIG. 7 is a flow diagram showing how command flow in the embodiment of FIG. 6 is accomplished.

FIG. 7 shows how the flow of command messages is accomplished. The PBX sends a Message 1 to the telephone. Message 1 travels from the PBX (via the link interface 116) to the Option Processor 702. The Option Processor then sends Message 1 to the highest priority option (the high priority option 704). The high priority option 704 then responds with Message 2, which is sent to the Option Processor 702. Next, the Option Processor 702 sends Message 2 to the next highest priority option (the low priority option 706). In response, the low priority option 706 generates Message 3, which is sent to the Option Processor 702. As no more options exist, the Option Processor 702 sends Message 3 to the Base Processor 708.

Figure 8:
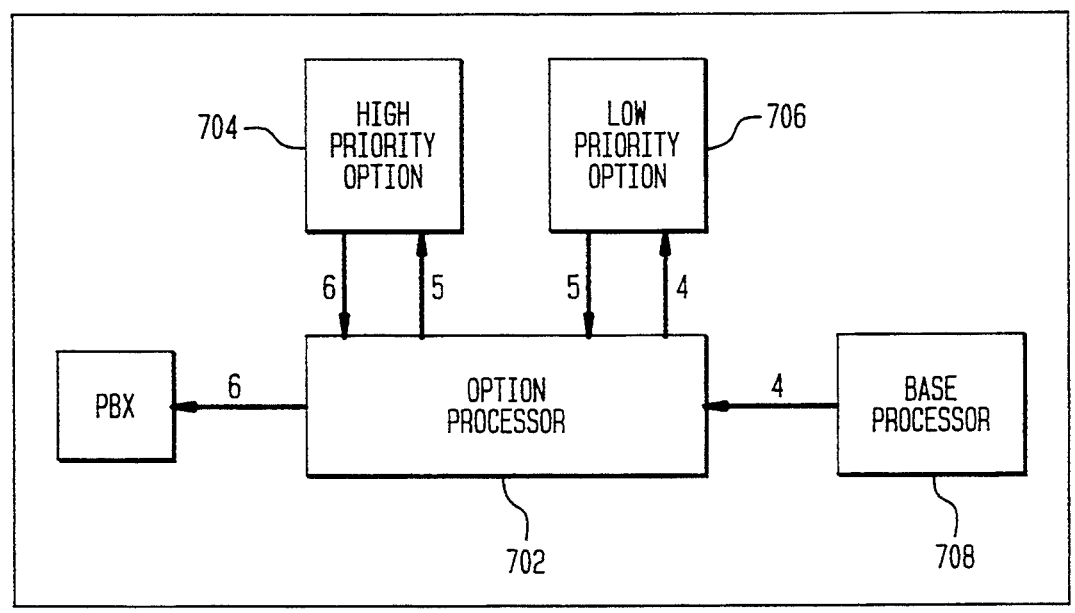
FIG. 8 is a flow diagram showing how event flow in the embodiment of FIG. 6 is accomplished.

This sequence is continued in FIG. 8 with the Base Processor 708 responding with an event, Message 4. The Base Processor 708 sends Message 4 to the Option Processor 702 which, in turn, relays Message 4 to the lowest priority option (the low priority option 706). The low priority option 706 responds with Message 5 and sends it to the Option Processor 702. Message 5 is then sent by the Option Processor 702 to the next highest priority option (the high priority option 704). The high priority option 704 responds with Message 6 and sends it to the Option Processor 702. As no more options exist, the Option Processor sends Message 6 to the PBX.

An example of a typical message sequence is a PBX request for phone ID, as illustrated by the following sequence. The PBX requests a phone ID from the telephone via Message 1. Message 1 is relayed to the high priority option 704 by the Option Processor 702. The high priority option 704 then sends Message 1 unchanged (as Message 2), to the Option Processor 702 which, in turn relays the message to the low priority option 706. The low priority option sends Message 2, unchanged, back to the Option Processor 702 as Message 3. The Option Processor 702 then relays Message 3 to the Base Processor 708.

The telephone base responds to Message 3, a request for phone ID, by identifying its ID, which it sends to the Option Processor as Message 4. The Option processor then relays this message to the next highest priority option (the low priority option 702). The low priority option 702 imparts its own ID on top of the Base phone ID (for example, if it is a DSS, indicating that more keys exist) and sends this collection of information (the Base phone ID and the low priority option ID), to the Option Processor as Message 5. The Option Processor then relays Message 5 to the high priority option 706. The high priority option 706 imparts its ID information on top of the message, for example indicating that it is a data communications option, and forwards this information (all three IDs), as an event (Message 6), to the Option Processor 702. When the Option Processor 702 receives Message 6, it relays it to the PBX. The final message (Message 6) indicates that the telephone contains both a data communications option and additional keys as well as information about the base model.

It should be understood that an option can handle a message in a number of ways. Some options will receive the message, take some action, and then not forward or modify the message at all. For example, in order to turn a speaker-phone option "on" in response to a PBX command, the microcontroller will send a command over the Option Bus. In response, the speaker-phone option will activate; however, it will not relay the message. Other options may modify a message without taking any action. For example, an extended keyboard option (DSS) may respond to a command to activate an indicator (e.g. light an LED) that the DSS determines is not present, by remapping the command to an indicator that is present elsewhere (e.g. on the main telephone). The DSS will then transmit the modified command to the Option Processor, in place of the original command which it received. The Option Processor then forwards the modified command to the telephone's main keyboard. Still other options will take some action and modify the message as well. For example, in response to a diagnostic command, each option may perform a test, append its status to the message and then forward the message on the next option by way of the Option Processor. As an example of another type of response, an Option for which a particular message is not intended will simply relay the message, unchanged, back to the Option Processor.

Commands (or fixed sequences of instruction codes) are sent to and from options with polled simultaneous command exchange on the Option Control Bus 126. Only one option at a time is selected by the telephone. This is referred to as polling. The Option Control Bus transfers are bi-directional, and both the telephone and the option will issue a command to each other when the telephone initiates the first transfer to an option. As the telephone can issue a poll to an option at any time, an option is required to have a command available for transfer within timing constraints. If a command with a specific function is not available, a NOP command is sent. A NOP can be issued by both the telephone and an option.

A convention for command acceptance is used to determine if the command from the telephone or option will be accepted. If the telephone issues a command, other than a NOP, it will always be accepted, regardless of the command issued by the polled option. If the polled option issues a command, other than a NOP, and the telephone issued a NOP, the polled option command is accepted. If both sides issue a NOP, the command transfer is complete and no data is sent. An individual command may include data associated with it or be a request for specific data.

An example of a command without associated data is an indication that the PBX issued a "phone reset". An example of a command with associated data is communication of a ROLMlink command. An example of a command with a request for data is a request for an option ID. Either the telephone or an option can issue any of the above-described types of commands.

An example of a command set is as follows: A No Operation (NOP) command is issued by the Option Processor or an Option when no operation needs to be performed. When both the Option Processor and the option issue a NOP, the poll is complete and no more Option Control Bus transfers will occur until the next poll of the opinion. In the case of only one side issuing a NOP, the non-NOP command is always accepted. This command enables the option processor to poll options for commands. It also enables options to indicate that they have no command to issue during a poll.

The Software Reset Option (RESET) command is issued by the Option Processor when it wants to perform a software reset of one or more options. The definition of the software reset will vary from option to option. The RESET command is issued twice to ensure synchronization. Options must respond to a single command, however, since they may be out of synchronization when the first reset command occurs. The RESET command is issued by the Option Processor whenever a microcontroller reset occurs.

The Report Specified ID (REPORT) command is issued by the Option Processor when it wants to request one of the following from an option: Option ID, Data Priority, Data Mask or Function ID. The command includes a single operand which identifies which information is to be reported. REPORT is a two byte command, while the response from the option is one byte containing the requested information. The information is reported by the option on the second byte of the command transfer.

The Base Receiving Data (BRD) command is a value which the Option Processor issues during the second transfer when the microcontroller is receiving a second transfer of a two byte command from an option. The value has no effect on the command accepted, however, it can help communicate the protocol externally to any external monitoring during debug.

The Option Receiving Data (ORD) command is issued by the option when it is receiving the second transfer of a two byte command from the Option Processor. This command is similar to BRD in that it has no effect on the command accepted; however, it can help communicate the protocol externally to any external monitoring during debug.

The Module Data (DATA) command can be issued by an option or the Option Processor. When the Option Processor issues DATA, control data, of an encoded type, is transferred to the option to which the command is directed. The data direction (command or event) is specified by a one bit field (D) of the command and the type of control data (TTT) is specified by a three bit field. Examples of control data types are Keyboard, Display, and Data (e.g. from a data communications option). When an option issues this command, and it is accepted, control data is transferred from the option to the Option Processor.

The timing of commands is as follows: Between the first and second command bytes (if a second command byte exists) at least 125 microseconds will have elapsed to allow for the option processor to respond and complete any other impending tasks. In addition, before a new command is issued, a minimum of 125 microseconds will elapse, to permit the option processor to respond and complete any other impending tasks.

Figure 9:
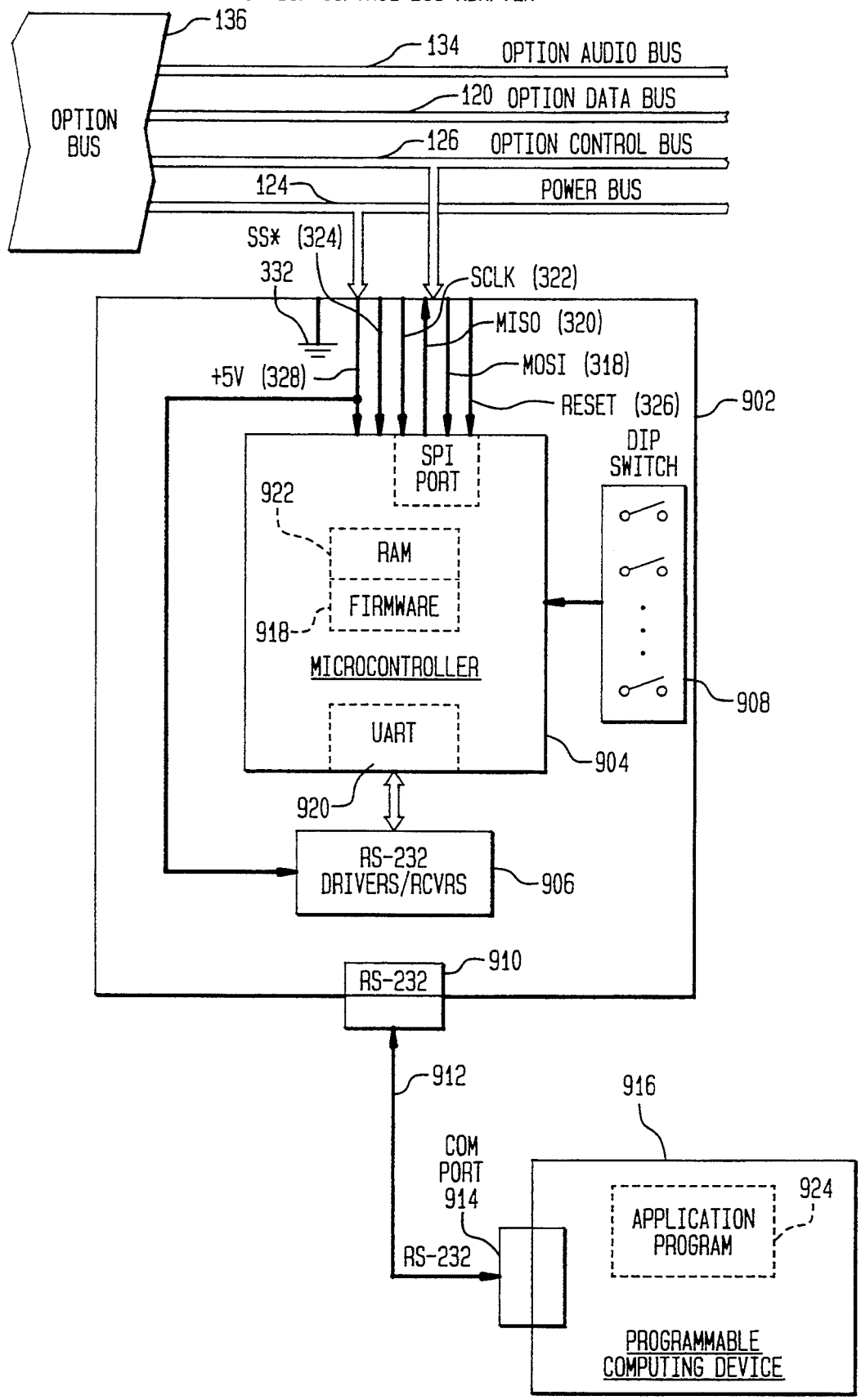
FIG. 9 is a block diagram of an Option Control Bus Adaptor (OCBA)

One of the options provided on the telephone can be an Option Control Bus Adaptor (OCBA). As illustrated in FIG. 9, the OCBA 902 connects to the Option Bus 136, but only requires the signals of the Option Control Bus 126 and the Option Power Bus 124. The OCBA 902 communicates with the base digital telephone via the hierarchical option control protocol as any option module would.

The OCBA 902 includes a microcontroller 904, a set of RS-232 drivers/receivers 906, a DIP switch 908, and a standard RS-232 connector 910 for connection to a standard RS-232 cable 912 and further connection to the standard RS-232 serial port 914 of a programmable computing device 916 (such as a personal computer). Data from the base telephone's microcontroller 118 is carried to the OCBA's microcontroller 904 on the MOSI line 318. Data from the OCBA's microcontroller 904 is carried to the telephone's microcontroller 118 by the MISO line 320. The SCLK 322 and SS*n 324 are provided to the OCBA's microcontroller 904 and operate as previously described. Information flow between the telephone and the OCBA 902 is mediated by the hierarchical option control protocol. The Reset line 326 is used by the OCBA 902 to synchronize during reset events within the telephone such as power on. Power is provided to the OCBA 902 from the Option Power Bus 124.

Although the embodiment of the OCBA 902 shown in FIG. 9 does not connect to the entire option bus 136, it can be desirable to make other information (such as that on the Option Data Bus 120) available to the programmable computing device 916 as well. Since the rate of information flow contained on this bus is much higher than what can be matched on standard RS-232 link, a faster conduit to the programmable computing device would used as described in more detail with respect to the embodiment of FIG. 13.

The DIP switch bank 908 is accessible to the user so that the user can set the switches to indicate any priority ranging from the lowest possible priority to the highest possible priority. The DIP switch bank 908 is connected to the microcontroller 904 so that the value of the entered priority can be read for transmission over the option bus at the appropriate time.

The microcontroller 904 comprises firmware 918 which dictates its handling of the option bus protocol and information received over the RS/232 link 912, a Universal Asynchronous Receiver Transmitter (UART) 920 which handles communications over the RS-232 link 912, and a random access memory (RAM) 922 which provides workspace and queue space. The queues formed in the RAM 922 include a "To Phone" queue which contains telephony control information received from the programmable computing device 916 and bound for the telephone and the "To Computing Device" queue which contains telephony control information which is received from the telephone and bound for the programmable computing device 916.

A set of RS-232 Driver/Receivers 906 connects the UART 920 to the a standard RS-232 physical connector 910 which provides the connection to a standard RS-232 cable 912. The RS-232 Driver/Receivers 920 produce signals which conform to the RS-232 standard. The RS-232 cable 912 is in turn connected to the standard RS-232 serial communications port 914 of the programmable computing device 916. The application program 924, executing on the programmable computing device 916, sends and receives telephony control information to and from the OCBA 902 via the serial communications port 914.

Figure 10:
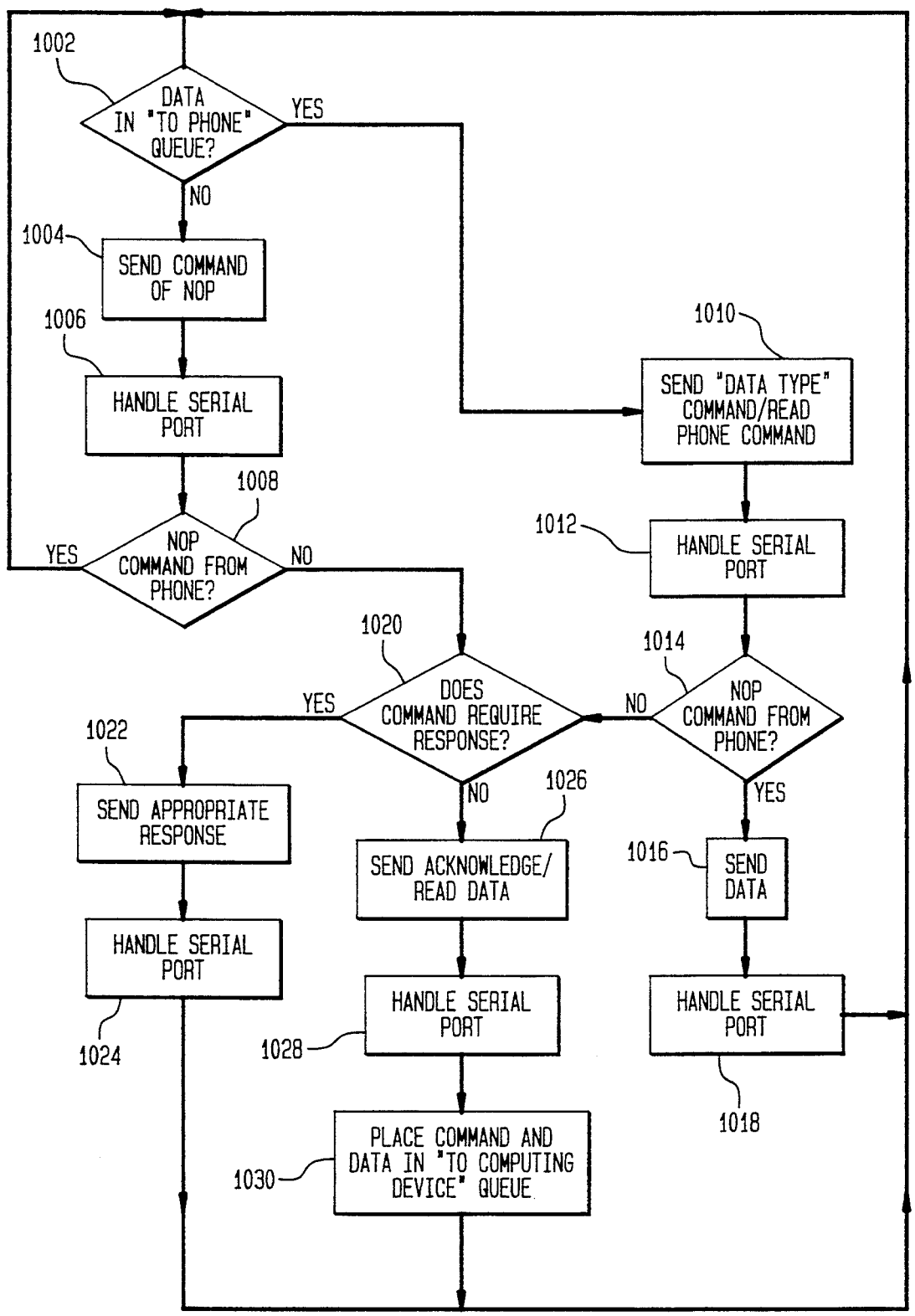
FIG. 10 is a flow diagram of the operation of the main loop of the OCBA firmware.

The operation of the main loop of the OCBA firmware 918 is illustrated in FIG. 10. The "To Phone" queue is checked in step 1002. If there is no information waiting to be sent to the telephone, then a Command of NOP is placed on the option control bus (step 1004) so that it will be read when the OCBA option 902 is polled by the telephone.

A convention of this firmware 918 is that any time the OCBA 902 sends information on the option control bus 136, it occupies the time necessary for the transfer to occur by servicing the UART 920 in both the transmitting and receiving directions. Step 1006 indicates this service. In step 1006, the firmware 918 checks for serial information coming from the programmable computing device 916, and if present, enqueues it for a later transfer over the option control bus 136 in the "To Phone" queue. The firmware 918 also transmits data from the "To Computing Device" queue to the programmable computing device 916 if data is enqueued and the UART 920 is ready to transmit data.

In step 1008, the firmware 918 checks to see if the Command from the telephone was a NOP command. If it was, then neither the telephone nor the OCBA 902 tried to transmit over the Option Control bus 126 and the main loop is repeated. If the Command was not a NOP, then the telephone had a command to transmit to the OCBA 902. The process of handling that command takes place starting at step 1020.

Returning to step 1002, if information was present in the "To Phone" queue, then the OCBA 902 tries to send the data by placing the "Data Type" Command on the Option Control bus 126. Since the Option Control bus 126 is bi-directional, the Command received from the telephone is also read (step 1010). In exactly the same manner as step 1006, the serial port UART 920 is handled (step 1012) while the Option Control bus 126 exchange takes place.

In step 1014, the firmware 918 checks to see if a NOP Command was received from the telephone. If it was, then the OCBA 902 can send its data byte over the Option Control bus 126 and does so in step 1016. As that bus transfer takes place, the serial port UART 920 is handled (step 1018) and control returns to the start of the main loop.

Returning to step 1014, if the command from the telephone was something other than a NOP, then control flows to step 1020. Since a command from the telephone always takes precedence over an Option bus Command, this step can also be arrived at from step 1008, as mentioned previously. The command is checked to see if it is one of the Option bus Commands from the telephone that require a response, such as a REPORT command requesting Option ID, Data Priority, Data Mask or Function ID. If this is the case, then control flows to step 1022, where the appropriate Data byte is transferred to the telephone by the OCBA 902. By convention the UART 920 is handled (step 1024) before control is returned to the start of the main loop.

If at step 1020, it was determined that the Command from the telephone did not require a response, then control flows to step 1026. In step 1026, the firmware 918 responds with a Option Receiving Data Command and reads the Data transmitted to it over the Option Control bus. By convention the UART 920 is handled (step 1028) before the Command and Data are enqueued in the "To Computing Device" queue (step 1030). Control then returns to the start of the main loop.

The OCBA 902 can be used to assist the user in many different scenarios. For example, it can allow the user to implement new telephony functions by programming them in application software.

A user can use the OCBA 902 to customize his telephone display with information that is important to him. For example, it is useful for a salesperson to be able to easily connect a person's name with the company the person works for. With a PBX that provides Automatic Number Identification (ANI), a caller's number is available on the telephone display. The salesperson can use a specialized application that lets him personalize his telephone display. The salesperson can maintain a database of his sales contacts on his PC. Included could be the contact's name, company and telephone number, and any other data important to the salesperson. The specialized application intercepts (via the OCBA 902) the display data written to the display and analyzes it to determine the ANI. It then rewrites the contents of the telephone's display so that it includes the person's name and company and returns the display data to the telephone via the OCBA 902. In addition, if the salesperson wants additional information available to him that will not fit on his display, the application can be set up to intercept (via the OCBA 902) depression of a specified key on his telephone and upon depression of that key display (by sending the display data back to the telephone via the OCBA 902) the next item of information about his caller on the telephone display. That key depression, being of a local operation, will not be passed on to the switch during the duration of his call.

Figure 11:
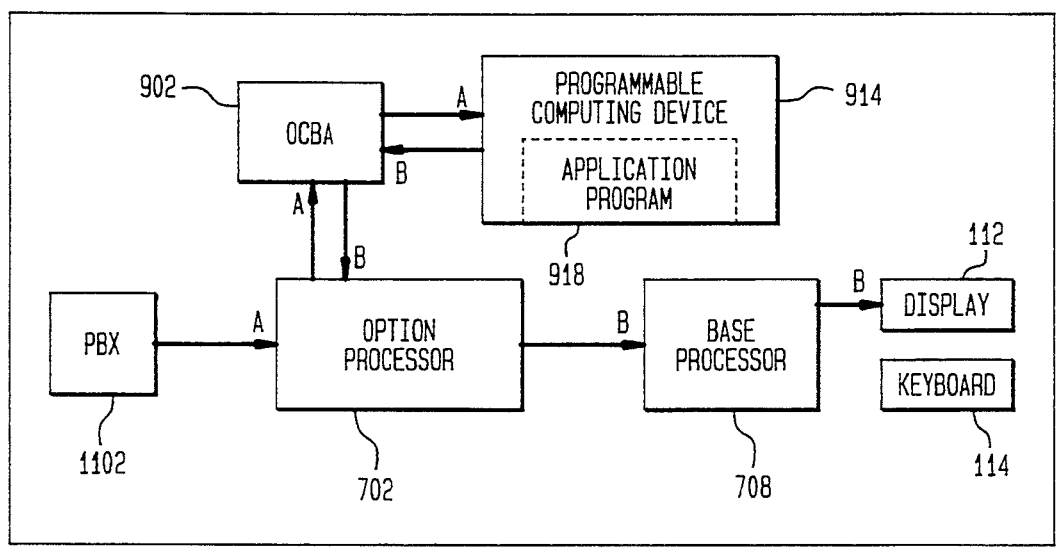
FIG. 11 is a block diagram of a message flow where a downlink message from a PBX is altered.

FIG. 11 illustrates an example where a downlink message from the PBX is altered. Message A comes from the PBX 1102 down to the telephone and contains the telephone number of the caller to be written to the telephone's integral display. The Option Processor 702 sends that control message to the OCBA 902. The OCBA 902 sends the message on to the programmable computing device 916 whose application program 924 captures that display message and uses its contents to look up the appropriate name and company information. The application program 924 then causes the programmable computing device 916 to send a new Message B to the display which contains the name and company information. That message is passed from the OCBA 902 to the Option Processor 702, the Base Processor 708 and finally to the telephone's display 112, where is it visible to the salesperson.

Figure 12:
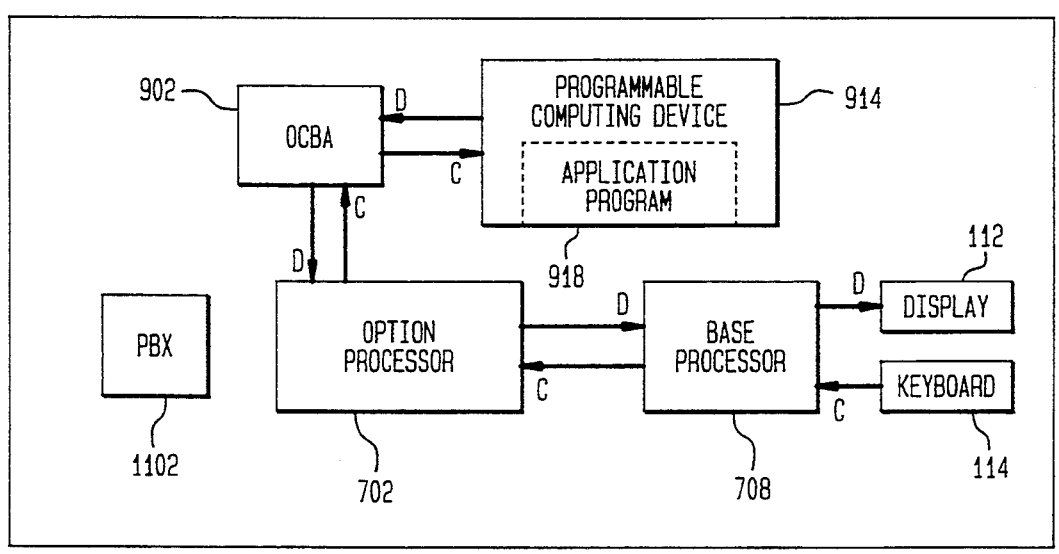
FIG. 12 is a block diagram of a message flow where an uplink message intended for a PBX is altered.

FIG. 12 illustrates the example where an uplink message intended for the PBX is altered. The user presses the special key on the keyboard 114 which toggles through the special information available on the caller. That key depression control message C is passed from the Base Processor 708 through the Option Processor 702 and on to the OCBA 902. The OCBA delivers the key depression message to the programmable computing device 916. The application program 924 determines that this particular key is the key which indicates the user wants the next piece of information on the caller. The application program 924 then sends a new Message D which contains the display information, the last sales call date and subject, to be sent to the telephone display. This message is passed from the OCBA 902 through the Option Processor 702 and the Base Processor 708 to the telephone's display 112.

An alternate embodiment provides access to the data streams of the Option Data Bus 120 as well as the Option Control Bus 126. As illustrated in FIG. 13, this embodiment of an Option Bus Adapter 1302 connects to the Option Data Bus 120, the Option Control Bus 126 and the Option Power Bus 124 of the Option Bus 136. Connection to the Option Data Bus 120 provides the Option Bus Adapter 1302 (and ultimately the application program 1304) access to the digital voice and data information in addition to the telephony control information of the Option Control Bus 126.

The Option Bus Adapter 1302 includes a microprocessor 1306, Read Only Memory (ROM) 1308, Random Access Memory (RAM) 1310, a High Speed Data Interface 1312 and a connector 1314 for the connection to the programmable computing device 1316. Connection to the Option Data Bus 120 and the Option Control Bus 126 are made via an Option Bus connector as previously described. A selector switch 1307, such as a DIP switch, is provided for setting configuration information such as option priority.

The signals of the Option Control Bus 126 are connected to a serial port 1318 of the microprocessor 1306 compatible with the conventional Serial Peripheral Interface (SPI). Control data from the phone's microcontroller 118 is brought to the Option Bus Adapter's microprocessor 1306 via the MOSI line 320. Control data from the Option Bus Adapter's microprocessor 1306 is brought to the phone's microcontroller 118 via the MISO line 318. The data are clocked by the SCLK line 322 and enabled by the SS*n line 324 at the appropriate time as previously described. The Option Bus Adapter 1302 communicates telephony control information with the telephone via the Option Control Bus 126 using the hierarchical option control protocol as previously described.

The signals of the Option Data Bus 120 are connected to another serial port 1320 of the microprocessor 1306 that is compatible with Time Division Multiplexed (TDM) serial data. Data is brought from the telephone on the Data Downstream (DD) 302 line to the Option Bus Adapter's microprocessor 1306. Data from the Option Bus Adapter's microprocessor 1306 is brought to the telephone on the Data Upstream (DU) 304 line. The Data Clock (DCL) 306 and the Frame Sync (FSC) 308 signals are provided on their respective lines to the Option Bus Adapter's microprocessor 1306. The voice and data information are organized into 8 bit fields as detailed previously in FIG. 4. The Option Bus Adapter's microprocessor 1306 has the ability, built into the TDM serial port's 1320 hardware, to extract the appropriate field from the data frame.

The Option Bus Adapter 1302 is connected to the programmable computing device 1316 via a High Speed Data Link (HSDL) 1322. This High Speed Data Link 1322 is implemented with a high speed synchronous serial protocol that is compatible with the high speed synchronous interface 1324 for a conventional personal computer (PC). The Data Link 1322 can be embodied as a conventional high speed synchronous serial data bus such as T1, ISDN or Fiber Optic (FDDI). A third serial port 1326 on the Option Bus Adapter's microprocessor 1306 is connected to the High Speed Data Interface 1312 via Transmit Data 1328, Receive Data 1330 and Clock 1332 lines. The High Speed Data Interface 1312 performs the signal conversions necessary to connect to the physical High Speed Data Link 1322. A standard connector 1314 is provided for the connection to the HSDL cable 1322 which links the Option Bus Adapter 1302 to the programmable computing device 1316. Connection to the programmable computing device 1316 is completed with a standard High Speed Serial interface card 1324 suitable with high speed synchronous serial data.

Firmware 1334 for the Option Bus Adapter 1302 is contained in the ROM 1308. The firmware 1334 is responsible for handling the hierarchical Option Control Bus protocol used on the Option Control Bus 126, extracting the voice and data fields from the Option Data Bus 120 and handling the High Speed Data Interface 1312 and its protocol. Telephony control, voice and data information from the telephone are assembled into packets appropriate for the high speed data protocol. This includes the addition of headers, footers and the Frame Check Sequence (FCS) information. Likewise, the firmware 1334 disassembles packets from the HSDL interface 1312 and sends the Telephony control, voice and data information to their respective busses. Data queues are maintained in the RAM 1310 for the control, voice and data information in both the uplink and downlink directions. Built in Direct Memory Access (DMA) 1336 hardware assists in transferring the data to or from the serial ports 1318, 1320 and 1326 to or from the Data queues in RAM 1310.

The Option Bus Adapter 1302 can be used to enhance the capabilities of the programmable computing device 1316. For example, it can add multimedia capabilites such as audio and video to the programmable computing device 1316.

Digital audio information from the telephone can be obtained from the Voice field 406 of the Option Data bus 120. This audio can be passed on to the programmable computing device 1316 via the Option Bus adapter 1302 and consequently used by the application program 1304. An example of this would be the annotation of word processed document with digital audio obtained from the telephone. Likewise the application program 1304 can send digital audio to the telephone via the Option Bus adapter 1302. An example of this would be playing a sound from the application program 1304 through the telephone.

Digital data information from the telephone can be obtained from the Data field 404 of the Option Data bus 120. This Data information can be passed on to of the programmable computing device 1316 via the Option Bus adapter 1302 and consequently used by the application program 1304. An example of this would be live video obtained from the telephone. A video conference connection could be established with a remote video conferencing system. The video information is sent to telephone via PBX and placed in the Data field 404 of Option Data bus 120. The Option Bus Adapter 1302 passes the video information on to the programmable computing device 1316 where the video can be displayed by the application program 1304. Likewise the application program 1304 can send video from a local source to the telephone via the Option Bus adapter 1302. An example of this would be using a video capture interface card in the programmable computing device 1316 and an attached camera to complete the video conference in both directions.

Now that the invention has been described by way of the preferred embodiment, various enhancements and improvements which to not depart from the scope and spirit of the invention will become apparent to those of skill in the art. Thus it should be understood that the preferred embodiment has been provided by way of example and not by way of limitation. The scope of invention is defined by the appended claims.

We claim:

1. An option for use with a digital telephone of a type in which options are electrically coupled to the digital telephone by way of an option bus including bus control signals and bus data signals, and wherein the option bus is further coupled to a telephony switch by way of a telephony link and to internal telephone components by way of an internal bus, the option comprising:
   a data Communication port accessible by an external computing device;
   means for interfacing with the option bus;
   means, coupled to the data communication port and the means for interfacing, for generating data communication signals indicative of telephony signals received from the switch by way of the telephony communication link and for providing the data communication signals to the data communication port;
   means, coupled to the data communication port and the means for interfacing, for receiving data indicative of modified telephony signals from the computing device and for providing the modified telephony signals to the telephone by way of the option bus;
   means for intercepting the telephony signals before they are sent to an internal telephone component to which they are directed and for sending the modified telephony signals to the internal telephone component in their stead.

2. The option of claim 1 wherein the telephony signals are Integrated Service Digital Network (ISDN) signals.

3. The option of claim 1 wherein the telephony signals are ROLMlink signals.

4. The option of claim 1 wherein the internal component is an integral telephone display and wherein the telephony data is display data.

5. The option of claim 1 wherein the data communication port is a serial port.

6. An option for use with a digital telephone of a type in which options are electrically coupled to the digital telephone by way of a option bus including bus control signals and bus data signals, and wherein the option bus is further coupled to a telephony switch by way of a telephony link and to internal telephone components by way of an internal bus, the option comprising:
   a data communication port accessible by an external computing device;
   means for interfacing with the option bus;
   means, coupled to the means for interfacing, for intercepting original telephony signals enroute between the switch and an internal component;
   transmitting means, coupled to the data communication port and the means for intercepting, for generating data communication signals indicative of the original telephony signals and for providing the data communication signals to the data communication port;
   receiving means, coupled to the data communication port and the means for interfacing, for receiving data indicative of modified telephony signals from the computing device;
   means, coupled to the receiving means, for sending the modified telephony signals to the telephone in place of the original telephony signals.

7. The option of claim 6 wherein the internal component is a telephone keypad and wherein the modified telephony signals are sent to a display device.

8. The option of claim 6 wherein the telephone comprises an option processor which services options in a priority order and wherein the option further comprises: means for setting the priority of the option for servicing by the option processor.

9. An option for use with a digital telephone of a type of which is connected to a branch exchange switch and wherein data indicative of telephony commands and information is carried between the switch and internal telephone devices by way of at least one internal bus, the option comprising:

an externally accessible communication port;

bus interface means, coupled to the bus, for intercepting the data;

first processing means, for passing the data back along the bus or passing the data to the externally accessible data communications port in response to a command from an applications program;

receiver means, coupled to the externally accessible communication port, for receiving modified data indicative of modified telephony commands or modified telephony data from the data communications port; and, second processing means, coupled to the receiver means, for passing the modified telephony commands or modified telephony data back to the bus in place of the original telephony signals.

10. A method of operating a digital telephone of a type which is connected to a branch exchange switch and wherein original telephony data indicative of telephony commands and information is carried between the switch and internal telephone devices by way of at least one internal bus, the method comprising the steps of:

intercepting the original telephony data;

generating data communication signals indicative of the telephony data;

providing the data communication signals to an computing device by way of an externally accessible data communication port;

receiving, from the computing device, signals indicative of modified telephony data; and, sending the modified telephony data to the bus in place of the original telephony data.

11. The method of claim 10 wherein the modified telephony data is sent to option module coupled to the bus.

12. The method of claim 10 wherein the modified telephony data is sent to an internal telephone component.

13. The method of claim 10 wherein the telephony data includes digital voice signals.

14. The method of claim 10 wherein the telephony data includes digital video signals.

* * * * *